(12) United States Patent
Queisser et al.

(10) Patent No.: US 6,306,979 B1
(45) Date of Patent: Oct. 23, 2001

(54) DERIVATIZED CARBON MONOXIDE COPOLYMERS

(75) Inventors: Joachim Queisser, Mannheim; Michael Geprägs, Lambsheim; Bernhard Rieger; Roland Wursche, both of Ulm, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,711

(22) PCT Filed: Mar. 4, 1999

(86) PCT No.: PCT/EP99/01408

§ 371 Date: Sep. 7, 2000

§ 102(e) Date: Sep. 7, 2000

(87) PCT Pub. No.: WO99/47583

PCT Pub. Date: Sep. 23, 1999

(30) Foreign Application Priority Data

Mar. 16, 1998 (DE) .............................. 198 11 123

(51) Int. Cl.⁷ ......................... C08F 283/00; C08G 14/00
(52) U.S. Cl. ................. 525/471; 528/392; 525/88; 525/90; 525/94; 525/534; 525/539; 524/233
(58) Field of Search ........................ 528/392; 525/471, 525/534, 539, 88, 90, 94; 524/233

(56) References Cited

U.S. PATENT DOCUMENTS 4,424,317  1/1984  Serres et al. .
4,616,072  10/1986  White .

FOREIGN PATENT DOCUMENTS 121 965    10/1984  (EP) .
272 727    6/1988   (EP) .
358 519    3/1990   (EP) .
463 689    1/1992   (EP) .
98/28354   7/1998   (WO) .

OTHER PUBLICATIONS

J.Org.Chem.417(1991)235–251, Drent et al.

Macromolecules,vol. 26, No. 5,1993,911–915,Sen et al.

J.Am.Chem.Soc.1995,117, 4455–4467,Jiang et al.

JP840098411 Derwent Abst.

J2232–338 Derwent Abst.

J07227025 Derwent Abst.

Macromolecules 1996,29,5852–5858,Kacker et al.

Primary Examiner—Samuel A. Acquah
(74) Attorney, Agent, or Firm—Keil & Weinkauf

(57) ABSTRACT

In a process for the preparation of derivatized carbon monoxide copolymers, functionalized linear, strictly alternating carbon monoxide copolymers of carbon monoxide, at least one 1-alkene (A), where (A) is an aryl compound substituted by at least one terminal allyl or homoallyl moiety and by at least one hydroxyl or amino group, or an a-olefinically unsaturated aliphatic alcohol, and, if desired, at least one $C_2$–$C_{20}$-1-alkene (B) are reacted with an organic compound (C) having at least one electrophilic group in an aprotic organic solvent.

12 Claims, No Drawings

DERIVATIZED CARBON MONOXIDE COPOLYMERS

The present invention relates to derivatized carbon monoxide copolymers. The invention further relates to a process for the preparation of said carbon monoxide copolymers and their use for the preparation of graft copolymers. In addition, the invention relates to graft, copolymers, a process for the preparation of said copolymers and their use for the preparation of moldings, fibers, films and coatings and their use as a compatibilizer in polymer blends or as a coating component. Finally, the invention relates to the use of functionalized carbon monoxide copolymers for the preparation of derivatized carbon monoxide copolymers.

Carbon monoxide copolymers can now be prepared in the form of strictly alternating linear copolymers from carbon monoxide and α-olefins such as ethene or propene using transition metal catalysts. Suitable catalyst systems are based on palladium complexes chelated with bidentate phosphine ligands (cf. EP-A-0 121 965 and J. Organomet. Chem. 417 (1991) 235). Conventional carbon monoxide/ethene or carbon monoxide/ethene/propene copolymers may usually be considered polymeric materials having a thermoplastic property spectrum. They exhibit good mechanical properties, e.g. with respect to impact resistance and abrasion, and good chemical resistance.

Apart from attempts to vary the polymer properties of carbon monoxide copolymers, such as the glass transition temperature, by the choice of the olefin component (cf. Jiang et al., J. Am. Chem. Soc. 117 (1995) 4455), it has also been attempted to obtain novel polymers by functionalizing the carbonyl group in the backbone of the chain, i.e. by polymer-analogous reactions.

For instance, Japanese patent applications JP-A 22 32 338 and JP-A 62 26 925 disclose the catalytic reduction of alternating carbon monoxide copolymers to form 1,4-polyalcohols. U.S. Pat. No. H1346 discloses the reaction with nitrogen-containing nucleophiles to give carbon monoxide/ethene/propene terpolymers having 2,5-pyrrole moieties. It is also possible to subject carbon monoxide copolymers to the Mannich reaction and to halogenate their methylene moiety (cf. U.S. Pat. No. 4,424,317 and U.S. Pat. No. 4,616,072).

Among the carbon monoxide copolymers known in the art, the carbon monoxide/ethene copolymer can be prepared relatively easily in large amounts, but the possible range of subsequent reactions is severely limited by its insolubility in all conventional solvents when it is used as a substrate for the abovementioned polymer-analogous reactions.

Furthermore, side reactions limit efficient derivatization of carbon monoxide copolymers. Examples of side reactions include subsequent free-radical reactions of the Norrish I and II type. Similarly, the addition of N-nucleophiles to the carbonyl group may also lead to a cleavage of the polymer backbone and thus to a reduction in the molecular weight of the copolymer.

It would therefore be desirable to be able to perform polymer-analogous reactions on carbon monoxide copolymers without side reactions and chain degradation.

It is an object of the present invention to provide carbon monoxide copolymers which may be derivatized without problems and without side reactions or reductions in molecular weight. It is another object of the invention to develop derivatized carbon monoxide copolymers which are suitable for further, subsequent reactions.

We have found that these objects are achieved by derivatized carbon monoxide copolymers obtainable by reacting, in an aprotic organic solvent, functionalized linear, strictly alternating carbon monoxide copolymers of carbon monoxide, at least one 1-alkene (A), where (A) is an aryl compound substituted by at least one terminal allyl or homoallyl moiety and by at least one hydroxyl or amino group, or an α-olefinically unsaturated aliphatic alcohol, and, if desired, at least one $C_2$–$C_{20}$-1-alkene (B) with an organic compound (C) having at least one reactive electrophilic group.

Furthermore, we have found a process for the preparation of derivatized carbon monoxide copolymers and their use for the preparation of graft copolymers.

Furthermore, we have found graft copolymers, a process for the preparation of said copolymers and their use for the preparation of moldings, fibers, films and coatings and their use as a compatibilizer in polymer blends or as a coating component.

Finally, we have found the use of functionalized linear alternating carbon monoxide copolymers of carbon monoxide, at least one 1-alkene (A), where (A) is an aryl compound substituted by at least one terminal allyl or homoallyl moiety and by at least one hydroxyl or amino group, or an α-olefinically unsaturated aliphatic alcohol, and, if desired, at least one $C_2$–$C_{20}$-1-alkene (B) for the preparation of derivatized carbon monoxide copolymers.

Suitable functionalized carbon monoxide copolymers which may be used for derivatization reactions in the present case are based on linear alternating carbon monoxide copolymers of carbon monoxide, at least one 1-alkene (A) which is an aryl compound substituted by at least one terminal allyl and/or homoallyl moiety and by at least one hydroxyl and/or amino group, or an α-olefinically unsaturated aliphatic alcohol, and, if desired, at least one $C_2$–$C_{20}$-1-alkene (B).

1-Alkenes (A) used are preferably compounds of formulae (Ia) or (Ib)

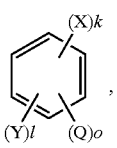

(Ia)

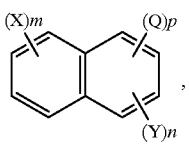

(Ib)

where
  X is OH or $NH_2$,
  Y is a compound of formula (II)

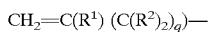

(II), where
  $R^1$ is hydrogen, linear and branched $C_1$–$C_{10}$-alkyl, preferably $C_1$–$C_6$-alkyl, such as methyl, ethyl, n-propyl, isopropyl, n-butyl or t-butyl, especially methyl, $C_3$–$C_{10}$-cycloalkyl, preferably $C_3$–$C_6$-cycloalkyl, such as cyclopropyl or cyclohexyl, $C_6$–$C_{10}$-aryl, preferably $C_6$–$C_{10}$-aryl, especially phenyl, and
  $R^2$ is independently at each appearance hydrogen, linear and branched $C_1$–$C_{10}$-alkyl, preferably $C_1$–$C_6$-alkyl, such as methyl, ethyl, n-propyl, isopropyl, n-butyl or t-butyl, especially methyl, $C_3$–$C_{10}$-cycloalkyl, preferably $C_3$–$C_6$-cycloalkyl, such as cyclopropyl or cyclohexyl, $C_6$–$C_{14}$-aryl, preferably $C_6$–$C_{10}$-aryl, especially phenyl, or halogen, such as fluorine, chlorine, bromine, iodine, and q is 1 or 2, Q is independently at each appearance linear or branched $C_1$–$C_{10}$-alkyl, preferably $C_1$–$C_6$-alkyl, such as methyl, ethyl, n-propyl, Isopropyl, n-butyl, s-butyl or t-butyl, especially methyl, isopropyl or t-butyl, $C_3$–$C_{10}$-cycloalkyl, preferably $C_3$–$C_6$-cycloalkyl, such as cyclopropyl or cyclohexyl, $C_6$–$C_{14}$-aryl, preferably $C_6$–$C_{10}$-aryl, especially phenyl, aralkyl having from 1 to 6, preferably from 1 to 3, carbon atoms in the alkyl moiety and from 6 to 14, preferably from 6 to 10, carbon atoms in the aryl moiety, for example benzyl, or $C_3$–$C_{30}$-organosilyl, for example trimethyl-, triethyl-, triisopropyl-, triphenyl-, t-butyldiphenyl- or t-hexyldimethylsilyl, preferably trimethylsilyl, where in the case of compounds of formula (Ia)

k, l are each an integer from 1 to 5 and o is an integer from 0 to 4, subject to the proviso that k+l+o≦6 and in the case of compounds of formula (Ib)

m, n are each an integer from 1 to 7 and p is an integer from 0 to 6, subject to the proviso that m+n+p≦8.

Particularly suitable compounds (A) have a terminal allyl moiety, i.e. are compounds of the formulae (Ia) and (Ib) where q=1. Of these olefinic monomers, the preferred monomers in turn have the terminal allyl moiety in a position ortho to a hydroxyl or amino group. Examples which may be mentioned are naphthyl compounds having an allyl moiety in the 1-position and one of the abovementioned polar groups in the 2-position or having an allyl moiety in the 2-position and a polar group in the 1- and/or 3-position and especially allylphenyl compounds having one or two polar groups in a position ortho to the allyl moiety.

Polar groups X that can be used are the hydroxyl group and the primary amino group. Suitable compounds are, for example, 2-allylphenol, 2-allyl-p-hydroquinone, 3-allyl-o-hydroquinone, 2-allylaniline, 2-allyl-4-aminophenol or 3-allyl-4-aminophenol, especially 2-allylphenol.

Furthermore, it is generally also possible to use compounds (A) having more than two or three polar groups X on the phenyl ring (compounds according to formula (Ia)) and more than three or four polar groups on the naphthyl ring (compounds according to formula (Ib)), provided that a terminal allyl or homoallyl moiety is present in the aryl derivative. It is likewise possible for a plurality of allyl or homoallyl moieties, preferably allyl moieties, to be all attached to the aryl derivative (up to 5 for compounds according to formula (Ia) and up to 7 for compounds (Ib)), provided that the aromatic skeleton has, in addition, a polar group X.

Terminal allyl or homoallyl moieties also include radicals whose hydrogen radicals, except the terminal hydrogen radicals, are independently of one another substituted by, for example, alkyl groups such as methyl, ethyl or isopropyl, aryl groups such as phenyl, aralkyl groups such as benzyl or halogens such as fluoro or chloro. Specific examples that may be mentioned are isopropylidene and isobutylidene moieties. However, preference is given to unsubstituted allyl or homoallyl moieties, especially allyl moieties.

As well as an allyl or homoallyl group Y and a polar group X, the compounds (A) may have further radicals on the aromatic system. Possible substituents are the radicals Q described at the outset. The ring radicals Q in (A) can be identical or different. In the aromatic systems of formulae (Ia) and (Ib), valences which are not already saturated by the radicals X, Y or Q are saturated by hydrogen atoms (C-H bonds). Thus, suitable compounds (A) also include 2-allyl-4-methylphenol, 2-allyl-4-t-butylphenol, 2-allyl-6-methylphenol, 2-allyl-4-phenylphenol, 2-allyl-4,6-dimethylphenol, 2,6-dimethyl-4-allylphenol, 2-allyl-4-t-butyl-6-methylphenol, 2,6-di-t-butyl-4-allylphenol, 2-allyl-6-methylaniline, 2-allyl-4-methylaniline or 2-allyl-4-t-butylaniline.

Other suitable 1-alkenes (A) are α-olefinically unsaturated aliphatic alcohols, especially terminal alcohols having a substituted or unsubstituted $C_2$–$C_{20}$-alkylene chain, e.g. allyl alcohol, 3-buten-1-ol, 4-penten-1-ol, 5-hexen-1-ol, 6-hepten-1-ol, 10-undecen-1-ol or 15-hexadecen-1-ol. Particularly suitable α-olefinically unsaturated alcohols have a $C_2$–$C_{15}$-alkylene chain, especially a $C_2$–$C_{10}$-alkylene chain such as allyl alcohol or 10-undecen-1-ol. Individual alkylene moieties, for example methylene moieties, may also be replaced by ether linkages in the alkylene chain. It is of course also possible to use any monomer mixtures of an aryl compound substituted with at least one terminal allyl or homoallyl moiety and at least one hydroxyl or amino group and an α-olefinically unsaturated aliphatic alcohol.

Suitable monomers (B) for nonbinary carbon monoxide copolymers, especially ternary copolymers, are in principle all the compounds of this class, e.g. α-olefins or diolefins having at least one terminal double bond. Examples of suitable α-olefins are $C_2$–$C_{20}$-1-alkenes, such as ethene, propene, 1-butene, isobutene, 4-methyl-1-pentene, 1-hexene, 1-octene and mixtures thereof. It is of course also possible to use 1-alkenes bearing an aromatic radical. For example, styrene, α-methylstyrene, p-methylstyrene or 2-methylstyrene may be used, preference being given to styrene. Other 1-alkenes that may be used are heteroatom-containing compounds, such as (meth)acrylic esters or amides or vinyl esters such as vinyl acetate. Particular preference is given to ethene, propene, 1-butene and styrene, especially propene. These 1-alkenes may of course also be used as mixtures.

Preferred functionalized carbon monoxide terpolymers are those of carbon monoxide, propene and component (A) and of carbon monoxide, ethene and component (A) in which a terminal allyl moiety and a hydroxyl or amino group are in a position ortho to each other in (A).

The binary functionalized carbon monoxide copolymers are generally poly-1,4-ketones having a regular structure. In particular, if aryl derivatives (A) which have an allyl moiety and a hydroxyl moiety in a position ortho to each other are used, the resulting carbon monoxide copolymers can also contain semiketal moieties which can be present in blocks or randomly distributed along the linear polymer chain. In these cases, the ratio of ketone fragments to ketal fragments is typically in the range from 10:1 to 1:5, preferably in the range from 4:1 to 1:1.

The structure of the functionalized carbon monoxide copolymers can be determined by $^1$H-NMR and $^{13}$C-NMR spectroscopy.

The average molecular weights $M_w$ of the binary carbon monoxide copolymers are usually in the range from 1000 to 3,500,000 g/mol, preferably in the range from 3000 to 250,000 g/mol, especially in the range from 5000 to 200,000 g/mol (determined by gel permeation chromatography (GPC) at 25° C. using microstyragel (Waters) as column material and chloroform as solvent against polystyrene standard).

The binary carbon monoxide copolymers generally have narrow molecular weight distributions $M_w/M_n$ (weight average/number average) as determined by gel permeation chromatography (GPC) as described hereinbefore. The $M_w/M_n$ values are preferably in the range from 1.1 to 3.5, especially smaller than 2.5. Particular preference is given to carbon monoxide copolymers having $M_w/M_n$ values in the range from 1.1 to 2.2.

The glass transition temperatures ($T_g$) of the binary carbon monoxide copolymers, if ascertainable, are usually in the range from 0 to 120° C., preferably in the range from 20 to 100° C., especially from 30 to 85° C.

The average molecular weights $M_w$ of the functionalized carbon monoxide terpolymers are usually in the range from 5000 to 500,000 g/mol, preferably from 20,000 to 300,000 g/mol, especially from 50,000 to 250,000 g/mol.

The $T_g$ values of the terpolymers are usually in the range from 0 to 150° C., preferably in the range below 90° C.

The proportion in the terpolymers which is derived from compound (A) is generally in the range from 0.1 to 60 mol %, based on the carbon monoxide moieties in the copolymer (as determined on the basis of $^1$H-NMR spectra). Suitable terpolymers typically have a proportion from 2 to 50, especially from 3 to 40, mol % of incorporated component (A). Just like the binary systems, the terpolymers and higher copolymers can also include randomly distributed or blocklike, preferably randomly distributed, semiketal structures in addition to pure 1,4-polyketone moieties.

This phenomenon is observed preferentially when the polar group in (A) is a hydroxyl group.

The binary and ternary carbon monoxide copolymers described are generally readily soluble in tetrahydrofuran (THF), toluene, dichloromethane or chloroform.

The molar ratio of carbon monoxide to the sum of the structural units derived from the olefinically unsaturated monomers in the binary or higher carbon monoxide copolymers is generally 1:1.

For the preparation of the functionalized linear binary and higher carbon monoxide copolymers, reference is expressly made to German patent application 19727271.1. If the monomers (A) used are α-olefinically unsaturated aliphatic alcohols, the functionalized carbon monoxide copolymers may also be prepared in accordance with the processes described in EP-A 0 463 689 and in Sen et al., Macromolecules 29 (1996) 5852–5858. The preparation processes described in the above-mentioned documents are hereby fully incorporated herein by reference.

Examples of suitable organic compounds (C) having one or more reactive electrophilic groups include aliphatic or aromatic acyl chlorides or carboxylic anhydrides. Of the anhydrides, both symmetrical anhyrides such as hexanoic or heptanoic anhydride and mixed anhydrides such as the anhydride of benzoic acid and acetic acid or the anhydride of propionic acid and acetic acid or cyclic carboxylic anhydrides such as glutaric anhydride, maleic anhydride, succinic anhydride or phthalic anhydride may be used to derivatize the free amino or hydroxyl group x in the functionalized carbon monoxide copolymer. Of the acyl chlorides, suitable reactants for amide or ester formation are, for example, aromatic acyl chlorides such as benzoyl chloride and saturated or unsaturated, linear or branched aliphatic acyl chlorides such as acetyl, hexanoyl or (meth) acroyl chloride. It is also possible to use long-chain saturated or double bond-containing compounds having a $C_8$–$C_{24}$-alkylene moiety with a terminal electrophilic group. Examples are decenoyl, undecenoyl and octadecenoyl chloride. It is also possible to use acyl chlorides of dicarboxylic acids or polycarboxylic acids such as oxalyl chloride or hexanedioic dichloride. It is of course also possible for the carboxylic acid group itself to be the electrophilic group, especially when suitable coupling reagents or reaction promoters are included.

The amide or ester formation between the functionalized carbon monoxide copolymer and the organic compound (C) may be carried out in a weakly acidic or in a weakly basic environment. Examples of suitable basic compounds are triethylamine, tributylamine, pyridine, quinoline or ammonium hydroxide. When acylating with acyl chlorides, carboxylic anhydrides or carboxylic acids, it is also possible to add reaction promoters such as 4-dimethylaminopyridines, imidazolides such as carbonyldiimidazole, dicyclohexylcarbodiimides, 2,2'-dipyridyl disulfide/triphenylphosphine or 2-pyridyl thiochloroformate.

Other organic compounds (C) having a reactive electrophilic group are isocyanates (R—N=C=O). It is possible to use both aromatic and aliphatic or cycloaliphatic isocyanates. Examples are phenyl, cyclohexyl, isopropyl and 1-phenylethyl isocyanate. The reaction with isocyanates is suitably conducted in the presence of Lewis acids or Lewis bases, which are preferably present in catalytic amounts. Lewis acids which may be used are generally any compounds of this class, i.e. for example weak and also strong Lewis acids. Preferred Lewis acids are organometallic compounds of main group IV and V of the periodic table of the elements, e.g. tin, antimony or bismuth compounds. Examples of suitable Lewis acids are tin dioctoate, dibutyltin bisdodecyl mercaptide, bis(tri-n-butyltin) oxide, dibutyltin oxide, tri-n-butyl-antimony oxide and bismuth oxide, especially dibutyltin dilaurate. Lewis bases which may be used are tertiary amines such as diazabicyclooctane (DABCO). The inventive reaction of the functionalized carbon monoxide copolymers with isocyanates in the manner described above provides carbon monoxide copolymers derivatized with urethane moieties.

Organic solvents suitable for the derivatization reactions according to the invention are polar aprotic solvents, for example halogenated hydrocarbons such as dichloromethane, 1,2-dichloroethane or chloroform, furthermore ethers such as diethyl ether or tetrahydrofuran and also dimethylformamide, dimethyl sulfoxide, hexamethylphosphoric triamide or mixtures of the abovementioned solvents.

The derivatized carbon monoxide copolymers according to the invention obtainable by a reaction with, for example, acyl chlorides or isocyanates can generally have a degree of derivatization of more than 10%, preferably more than 15%, especially more than 20%, the degree of derivatization depending, inter alia, on the amount of organic compound (C) used. The degree of derivatization represents the proportion of coupled electrophilic reagent, based on the free hydroxyl or amino groups in the starting copolymer. The degree of derivatization may be determined by $^1$H-NMR spectroscopy.

The molecular weights $M_w$ of the derivatized carbon monoxide copolymers according to the invention are generally above 1000 g/mol, preferably above 10,000 g/mol, particularly preferably above 25,000 g/mol.

In contrast to the starting compounds, i.e. the functionalized carbon monoxide copolymers, the derivatized carbon monoxide copolymers have one or more glass transition temperatures. These are generally above 20° C., preferably above 30° C., particularly preferably above 40° C.

Another, preferred embodiment comprises carbon monoxide copolymers derivatized with organic compounds (C) having two or more electrophilic groups. Examples of such compounds include acyl chlorides or carboxylic anhydrides of dicarboxylic acids such as adipic, glutaric or fumaric acid and also, in particular, diisocyanate compounds. Examples of diisocyanates are tolylene 2,4- or 2,6-diisocyanate, isophorone diisocyanate, 4,4'-diisocyanatodiphenylmethane, hexamethylene 1,6-diisocyanate, cyclohexyl 1,4-diisocyanate or naphthyl 1,5-diisocyanate, preference being given to toluylene 2,4-diisocyanate and hexamethylene 1,6-diisocyanate. The carbon monoxide copolymers derivatized with the above-mentioned bifunctional or polyfunctional compounds therefore have at least one free electrophilc group.

It has been found that this free functionality is suitable for coupling reactions with nucleophilic organic compounds. As well as aliphatic or aromatic monohydroxy or polyhydroxy compounds or monoamino or polyamino compounds such as methanol, ethanol, isopropanol, n-butanol, t-butanol, 1,4-butanediol, cyclohexanol, phenol, methylamine, dimethylamine, ethylamine, ethylenediamine, diisopropylamine or cyclohexylamine, these are in particular macromers having at least one terminal nucleophilic group. For the purposes of the present invention, macromers are oligomers having an average molar mass $M_w$ of more than 100 g/mol and preferably less than 10,000 g/mol. In a particular embodiment, amino-functionalized or hydroxy-functionalized macromers are used. Examples of suitable macromers are the polyethers derived from polyethylene glycol or poly-1,4-butanediol, such as polyethylene glycol monobutyl ether or poly(1,4-butanediol) bis(4-aminobenzoate).

Also suitable for coupling are polymers having terminal or pendant functional groups, for example polyamides, polybutylene terephthalate, polyphenylene ethers, polyether sulfones or polycarbonates each having at least one terminal hydroxyl or amino group. As well as the aforementioned polymers which usually already have terminal or pendant functional groups in their conventional form, it is also possible to use, in particular, modified polymers into which hydroxy-functional or amino-functional groups have been specifically incorporated. Examples of suitable conventional polymers are commercially available polyamide such as Ultramid® or Ultramid® T, polybutylene terephthalate such as Ultradur®, polyether sulfone such as Ultrason® E (the aforementioned brands are products of BASF AG), polyphenylene ethers such as Noryl® (GE Plastics) or polycarbonate such as Lexan® (GE Plastics). Of the aforementioned compounds, preference is given to polyamides and polybutylene terephthalate. Polyphenylene ethers having terminal hydroxyl groups are described, for example, in J. E. McGrath et al., Polym. Eng. Sci. 17 (1977) 647.

Suitable solvents for the graft reaction according to the invention are, as for the derivatization of functionalized carbon monoxide copolymers, polar aprotic solvents, for example halogenated hydrocarbons such as dichloromethane, 1,2-dichloroethane or chloroform, furthermore ethers such as diethyl ether or tetrahydrofuran and also dimethylformamide, dimethyl sulfoxide, hexamethylphosphoric triamide or mixtures of the aforementioned solvents.

Reaction times for the derivatization reactions and for the graft reactions are typically in the range from 1–2 hours to several days. In the aforementioned processes of the invention, reaction temperatures are generally in the range from –10 to 100° C., preferably in the range from 0 to 80° C., particularly preferably from 10 to 60° C.

The grafting reaction may be carried out using the acid or basic systems described for the derivatization reaction. Basic compounds include triethylamine, tributylamine, pyridine, quinoline or ammonium hydroxide for the formation of an ester or amide bond. When acylating using acyl chlorides, carboxylic anhydrides or carboxylic acids, it is also possible to use reaction promoters such as 4-dimethylaminopyridines, imidazolides such as carbonyldiimidazole, dicyclohexylcarbodiimides, 2,2'-dipyridyl disulfide/triphenylphosphine or 2-pyridyl thiochloroformate. If the group available for grafting is an isocyanate moiety, it is possible to promote the reaction using the Lewis acids and Lewis bases used for the derivatization of the functionalized carbon monoxide copolymers, in particular dibutyltin dilaurate.

The grafting reaction is advantageously carried out by reacting the derivatized carbon monoxide copolymer directly, without isolation or purification, with the nucleophilic organic compounds. It is generally possible to mix the reactants in any sequence; however, preference is given to adding the reaction solution of the derivatized carbon monoxide copolymer to a solution of a macromer having e.g. a hydroxyl or amino group.

The derivatized carbon monoxide copolymers according to the invention may a-so be reacted with macromers or polymers having hydroxyl or amino groups under reactive extrusion conditions as described in the monograph "Reactive Extrusion, Principles and Practice" by M. Xanthos, Carl Hanser Verlag, Munich, 1992.

The carbon monoxide copolymers derivatized with isocyanates or acyl chlorides, for example, can be recovered by precipitation in, for example, petroleum ether or methanol. They can be isolated and purified according to conventional methods by redissolving and controlled reprecipitation of the derivatized product. Similarly, the graft copolymers according to the invention may be recovered by precipitation in, for example, methanol or diethyl ether. The grafted products may be taken up again, if desired, for example in dichloromethane, to be precipitated to give a product of high purity freed from contaminants.

The graft copolymers according to the invention generally have a degree or grafting, i.e. a proportion of coupled nucleophile, e.g. macromer, based on, for example, the free isocyanate groups in the starting compound, of more than 10%, preferably more than 15%. The molecular weights of the graft copolymers depend both on the molecular weights of the derivatized carbon monoxide copolymers and of the coupling component, e.g. on the macromer, and on the degree of derivatization. The graft copolymers of the invention usually have molecular weights in excess of 10,000 g/mol.

The graft copolymers according to the invention may be used for the preparation of moldings, fibers, films or coatings, and also as a compatibilizer in polymer blends. They can also be used as a coating component, e.g. in multilayer film systems.

The processes for the preparation of both the derivatized carbon monoxide copolymers and the graft copolymers according to the invention proceed without side reactions, so that chain cleavage or reduction in molecular weight are not observed.

The Examples which follow illustrate the invention.

EXAMPLES

The acyl chlorides and isocyanates used in the derivatization reactions and dibutyltin dilaurate ($Bu_2SnLau_2$) were purchased from Fluka, and poly(ethyleneglycol) monobutyl ether and poly(1,4-butanediol)bis(4-aminobenzoate) were purchased from Aldrich. These products were used without further purification.

Dichloromethane was dried over $CaH_2$ and then distilled. All reactions were performed under standard Schlenk conditions.

$^1$H and $^{13}$C-NMR spectra were recorded on a Bruker AMX 500 spectrometer. DSC measurements were carried out on a Perkin-Elmer DSC-7 instrument (heating rate 20°/minute). The glass transition temperature was determined from the second run after cooling down to −50° C. GPC measurements were carried out in relation to a linear polystyrene standard in chloroform or tetrahydrofuran (THF) using a Waters instrument equipped with microstyragel columns and an RI detector.

The alternating copolymer of CO and 2-allylphenol (APCO) was prepared in accordance with the method described in German patent application 19727271.1. It had an average molecular weight $M_w$ of 22,700 g/mol and a polydispersity of 2.2 as determined in chloroform.

I. General procedure for the reaction of functionalized carbon monoxide copolymers of carbon monoxide and 2-allylphenol. (APCO) with acyl chlorides.

Pyridine (3 ml) and the acyl chloride (30 mmol) were added to APCO (0.45 g) in dichloromethane (20 ml) at 0° C. The mixture was stirred at room temperature for 48 hours, and the reaction product was precipitated by pouring the reaction mixture into methanol (500 ml), filtered and dried under a high vacuum. The results are summarized in Table 1.

TABLE 1

|   | Acyl chloride | $M_W$ a), b) (g/mol) | Degree of deriv. (%)c) |
|---|---|---|---|
| 1 | Benzoyl chloride | 35,000 | 24 |
| 2 | Undecenoyl chloride | 42,700 | 23 | a)Molecular weight of the derivatized carbon monoxide copolymer
b)Determined by gel permeation chromatography in chloroform against a polystyrene standard
c)Determined by 1H-NMR spectroscopy II General procedure for the reaction of APCO with isocyanates Isocyanate (R—N=C=O) (30 mmol) and $Bu_2SnLau_2$ (0.5 ml) were added to APCO (0.45 g) in dichloromethane (20 ml). The reaction mixture was stirred at room, temperature for 24 h in the case of aromatic isocyanates and stirred at 40° C. for 24 h in the case of aliphatic isocyanates. The reaction product was precipitated by introducing the reaction solution into petroleum ether 40/60 (500 ml) and separated off by filtration. The crude product obtained was dissolved in dichloromethane, separated from insolubles and precipitated from methanol, then filtered and dried under a high vacuum. The results are summarized in Table 2.

TABLE 2

|   | R | $M_W$ b), c) (g/mol) | Degree of deriv. (%)d) | $T_g$ (° C.) |
|---|---|---|---|---|
| 3 | Phenyl | 36,900 | 25 | 53.7 |
| 4 | Cyclohexyl | 30,800 | 27 | n.d. |
| 5 | Isopropyl | 29,300 | 28 | n.d. |
| 6 | R(+)-1-phenylthyla) | 28,300 | 5 | n.d. | a)The amount of R(+)-1-phenylethyl isocyanate used was 3 mmol
b)Molecular weight of the derivatized carbon monoxide copolymer
c)Determined by gel permeation chromatography in chloroform against a polystyrene standard
d)Determined by 1H-NMR spectroscopy III. General procedure for the reaction of APCO with diisocyanates Toluylene 2,4-diisocyanate (5.6 mmol) and $Bu_2SnLau_2$ (0.5 ml) were added to APCO (0.45 g) in dichloromethane (10 ml) and the mixture was stirred at room temperature for 24 h. The resulting reaction solution was used as such, or filtered, for subsequent derivatization.

IV. Preparation of graft copolymers a) Reaction with polyethylene glycol monobutyl ether The reaction solution obtained as described under III. was added dropwise to polyethylene glycol monobutyl ether (11.7 ml; $M_n$=206 g/mol) in dichloromethane (20 ml) at room temperature with stirring. A further 0.5 ml of $Bu_2SnLau_2$ were added and the mixture was stirred at room temperature for 24 h. The reaction solution was introduced into methanol (500 ml), the precipitated product was separated off by filtration and residual solvent was removed under a high vacuum (yield: 0.3 g; molecular weight $M_w$=54,600 g/mol; degree of derivatization: 21%).

b) Reaction with poly(1,4-butanediol bis(4-aminobenzoate)

The reaction solution obtained as described under III. was added dropwise to poly(1,4-butanediol bis(4-aminobenzoate) (3 mmol; $M_n$=1200 g/mol) in dichloromethane (20 ml) at room temperature with stirring and the mixture was stirred for 24 h. The reaction was terminated by addition of n-butylamine (2 ml), the reaction mixture was precipitated in diethyl ether, separated off and, if appropriate, purified further by taking up in dichloromethane again and precipitating in diethyl ether. Residual solvent was removed from the product separated off by filtration under a high vacuum (yield: 1 g; molecular weight $M_w$=14,800 g/mol).

We claim:

1. A process for the preparation of derivatized carbon monoxide copolymers, which comprises reacting, in an aprotic organic solvent, functionalized linear, strictly alternating carbon monoxide copolymers of carbon monoxide, at least one 1-alkene (A), where (A) is an aryl compound substituted by at least one terminal allyl or homoallyl moiety and by at least one hydroxyl or amino group, or an α-olefinically unsaturated aliphatic alcohol, and, if desired, at least one $C_2$–$C_{20}$-1-alkene (B) with an organic compound (C) having at least one electrophilic group.

2. A process for the preparation of derivatized carbon monoxide copolymers as defined in claim 1, wherein the 1-alkenes (A) used are compounds of formulae (Ia) or (Ib)

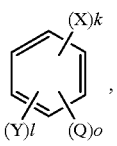
(Ia)

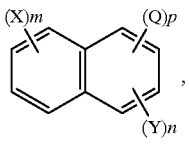
(Ib)

where

X is OH or $NH_2$,

Y is a compound of formula (II)

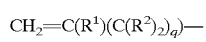
$$CH_2=C(R^1)(C(R^2)_2)_q—$$ (II), where $R^1$ is hydrogen, linear and branched $C_1$–$C_{10}$-alkyl, $C_3$–$C_{10}$-cycloalkyl, $C_6$–$C_{10}$-aryl, and $R^2$ is independently at each appearance hydrogen, linear and branched $C_1$–$C_{10}$-alkyl, $C_3$–$C_{10}$-cycloalkyl, $C_6$–$C_{14}$-aryl or halogen, and q is 1 or 2, Q is independently at each appearance linear or branched $C_1$–$C_{10}$-alkyl, $C_3$–$C_{10}$-cycloalkyl, $C_6$–$C_{14}$-aryl, aralkyl having from 1 to 6 carbon atoms in the alkyl moiety and from 6 to 14 carbon atoms in the aryl moiety, or $C_3$–$C_{30}$-organosilyl, where in the case of compounds of formula (Ia)

k, l are each an integer from 1 to 5 and o is an integer from 0 to 4, subject to the proviso that $$k+l+o \leq 6$$

and in the case of compounds of formula (Ib)

m, n are each an integer from 1 to 7 and p is an integer from 0 to 6, subject to the proviso that $$m+n+p \leq 8.$$

3. A process for the preparation of derivatized carbon monoxide copolymers as defined in claim 1, wherein the organic compounds (C) used have two or more electrophilic groups.

4. Derivatized carbon monoxide copolymers obtained by the process as defined in claim 1.

5. Derivatized carbon monoxide copolymers obtained by the process as defined in claim 3.

6. A process for the preparation of graft copolymers, which comprises reacting, in an aprotic organic solvent, derivatized carbon monoxide copolymers as defined in claim 5 with a nucleophilic organic compound.

7. A process for the preparation of graft copolymers as defined in claim 7, wherein the nucleophilic organic compounds used are amino-functionalized or hydroxy-functionalized macromers or polymers.

8. A process for the preparation of graft copolymers as defined in claim 7, wherein the nucleophilic organic compounds used are amino-functionalized or hydroxy-functionalized polyamides, polybutylene terephthalates, polycarbonates or polysulfones.

9. Graft copolymers obtained by the process of claim 6.

10. Graft copolymers prepared from the derivatized carbon monoxide copolymers of claim 5.

11. Moldings, fibers, films or coatings prepared from the graft copolymers of claim 9.

12. Polymer blends containing the graft copolymers of claim 9 as compatibilizers.

* * * * *